US012703772B2

(12) United States Patent
Henze et al.

(10) Patent No.: US 12,703,772 B2
(45) Date of Patent: Aug. 11, 2026

(54) FLAME RETARDANT POLYAMIDE

(71) Applicant: BASF SE, Ludwigshafen am Rhein (DE)

(72) Inventors: Oliver Steffen Henze, Lemfoerde (DE); Birte Nitz, Lemfoerde (DE); Tanja Lange, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 653 days.

(21) Appl. No.: 17/606,814

(22) PCT Filed: Apr. 29, 2020

(86) PCT No.: PCT/EP2020/061843
§ 371 (c)(1),
(2) Date: Oct. 27, 2021

(87) PCT Pub. No.: WO2020/221785
PCT Pub. Date: Nov. 5, 2020

(65) Prior Publication Data

US 2022/0363827 A1 Nov. 17, 2022

(30) Foreign Application Priority Data

Apr. 30, 2019 (EP) .................................... 19171847

(51) Int. Cl.

| | |
|---|---|
| ***C08L 77/02*** | (2006.01) |
| ***C08G 18/76*** | (2006.01) |
| ***C08G 69/16*** | (2006.01) |
| ***C08G 69/36*** | (2006.01) |
| ***C08K 3/016*** | (2018.01) |
| ***C08K 3/32*** | (2006.01) |
| ***C08K 5/3492*** | (2006.01) |
| ***C08K 5/523*** | (2006.01) |
| ***C08K 5/5313*** | (2006.01) |
| ***C08L 75/08*** | (2006.01) |
| ***C08L 77/08*** | (2006.01) |

(52) U.S. Cl.
CPC ......... *C08G 69/36* (2013.01); *C08G 18/7671* (2013.01); *C08G 69/16* (2013.01); *C08K 3/016* (2018.01); *C08K 3/32* (2013.01); *C08K 5/34928* (2013.01); *C08K 5/523* (2013.01); *C08K 5/5313* (2013.01); *C08L 75/08* (2013.01); *C08L 77/08* (2013.01); *C08K 2003/329* (2013.01)

(58) Field of Classification Search
CPC ........... C08L 77/00; C08L 77/02; C08L 77/08
USPC .................................................. 524/126, 127
See application file for complete search history.

(56) References Cited

U.S. PATENT DOCUMENTS 3,813,339 A * 5/1974 Boehringer et al. ..... C10M 3/00 508/492
4,212,777 A 7/1980 Goletto
5,011,893 A * 4/1991 Miyamoto ............. C08G 69/36 525/432
5,013,518 A 5/1991 Nielinger et al.
6,211,266 B1 * 4/2001 Weber ..................... C08L 77/00 524/514
10,808,120 B2 10/2020 Wagner et al.
11,149,124 B2 10/2021 Minkwitz et al.
2004/0012003 A1 * 1/2004 Tabushi ................... C08K 9/02 252/601
2007/0299171 A1 12/2007 Couillens et al.
2015/0148468 A1 5/2015 Immel et al.
2018/0298189 A1 10/2018 Wagner et al.
2019/0144671 A1 * 5/2019 Akatsu ................ B29C 45/0001 524/100
2020/0123335 A1 4/2020 Minkwitz et al.
2020/0230876 A1 7/2020 Gabriel et al.

FOREIGN PATENT DOCUMENTS

CN 103160111 6/2013
CN 105085984 B * 4/2019 ........... C08K 5/5313
DE 2846596 5/1979
DE 10103424 8/2002
EP 0352562 1/1990
EP 2878630 11/2019
JP 07053863 A * 2/1995
JP 08311334 A * 11/1996
JP 5469828 B2 * 4/2014 .............. C08L 77/12
WO WO-9614362 A1 * 5/1996 ........... C09D 5/1662
WO 2010/084845 A1 7/2010
WO 2017/063841 4/2017
WO 2018/050487 3/2018

(Continued)

OTHER PUBLICATIONS

Machine translation of CN-105085984-B (no date).*

(Continued)

*Primary Examiner* — Michael J Feely

(74) *Attorney, Agent, or Firm* — Grüneberg Global IP, PLLC

(57) ABSTRACT

A composition contains at least a copolyamide (PA-1) as a component (I), produced by polymerization of at least one lactam and of a monomer mixture (M) which contains at least a $C_{32}$-$C_{40}$ dimer acid and at least a $C_4$-$C_{12}$ diamine; and a flame retardant (F1) as a component (II). The flame retardant (F1) is selected from melamine cyanurates, magnesium hydroxide, and phosphorus-containing flame retardants. A process can be used for preparing such compositions, and the composition can be used for producing shaped articles.

17 Claims, No Drawings

(56) References Cited

FOREIGN PATENT DOCUMENTS

| | | | | |
|---|---|---|---|---|
| WO | WO-2019057849 A1 * | 3/2019 | ............. | C08G 69/34 |
| WO | 2019/068659 | 4/2019 | | |
| WO | 2020/035455 A1 | 2/2020 | | |

OTHER PUBLICATIONS

Machine translation of JP-5469828-B2 (no date).*
Machine translation of JP 07053863 A (no date).*
Machine translation of JP 08311334 A (no date).*
International Preliminary Report issued Jul. 30, 2021 in PCT/EP2020/061843, 8 pages.

* cited by examiner

FLAME RETARDANT POLYAMIDE

CROSS-REFERENCE TO RELATED APPLICATIONS

This application is the National Stage entry under § 371 of International Application No. PCT/EP2020/061843, filed on Apr. 29, 2020, and which claims the benefit of priority to European Application No. 19171847.7, filed on Apr. 30, 2019. The content of each of these applications is hereby incorporated by reference in its entirety.

BACKGROUND OF THE INVENTION

Field of the Invention

The present invention relates to a composition comprising at least a copolyamide (PA-1) as component (I), prepared by polymerization of at least one lactam, and a monomer mixture (M) comprising at least one C32-C40 dimer acid and at least one C4-C12 diamine; and a flame retardant (F1) selected from the group consisting of melamine cyanurates, magnesium hydroxide and phosphorus-containing flame retardants as component (II). The present invention further relates to a process for producing such compositions and to the use of a composition of the invention for production of shaped articles.

DESCRIPTION OF RELATED ART

Flame-retardant polyamides are widely known. Polyamides generally have high melt strength and very wide processing ranges. Polyamides are of particular significance in industry since they feature very good mechanical properties and especially have high strength and toughness, good chemical stability and high abrasion resistance. They are used, for example, for production of fishing line, climbing rope and carpet backing. Furthermore, polyamides find use for production of packing films and packing sheaths.

For packing films and packing sheaths, copolyamides that combine positive properties of different polyamides are frequently also used. The prior art describes various copolyamides.

EP 0 352 562 describes films composed of copolyamides, wherein the copolyamides have been prepared from ε-caprolactam and preferably 1 to 10 parts by weight of a dimer acid and a diamine, DE 28 46 596 describes shaped articles composed of a copolyamide of caprolactam, fatty acid dimers and hexamethylenediamine. Of particular industrial interest are nylon-6 and nylon-6,6, owing to their excellent properties can be used in many sectors. However, nylon-6 and nylon-6,6 have very high melting temperatures.

WO 2018/050487 A1 describes copolyamides, wherein the copolyamide has been prepared by polymerizing at least one lactam (A) and a monomer mixture (M), Additionally described is the production of a polymer film (P) comprising such copolyamides.

Of particular industrial interest are nylon-6 and nylon-6,6, owing to their excellent properties can be used in many sectors. However, nylon-6 and nylon-6,6 have very high melting temperatures, above the breakdown temperatures of many flame retardants. The production and processing of flame-retardant nylon-6 and nylon-6,6 also require high temperatures. Other polyamides, for example nylon-12, melt at lower temperatures, but are only of limited availability on the market.

There is accordingly a need to produce flame-retardant polyamides that can be processed at low temperatures and have excellent flame retardancy characteristics.

SUMMARY OF THE INVENTION

Proceeding from the prior art, it was an object of the present invention to provide materials that have improved melt strength and hence a broad processing range, particularly within the hardness range from 40 to 90 D. It was a further object of the present invention to provide materials that have improved melt strength and hence a broad processing range, and are additionally transparent.

This object is achieved in accordance with the invention by a composition (Z-2) comprising at least

- (I) a copolyamide (PA-1), prepared by polymerization of
  - (A) at least one lactam, and
  - (B) a monomer mixture (M) comprising the following components:
  - (B1) at least one C32-C40 dimer acid and
  - (B2) at least one C4-C12 diamine;

and
- (II) a flame retardant (F1) selected from the group consisting of melamine cyanurates, magnesium hydroxide and phosphorus-containing flame retardants.

DETAILED DESCRIPTION OF THE INVENTION

It has been found that, surprisingly, many flame retardants, including flame retardants having relatively low breakdown temperature, can be incorporated into the copolyamide (PA-1). The materials obtained have excellent mechanical properties, high toughness and good flammability performance.

The composition (Z-2) of the invention comprises at least one copolyamide (PA-1). The proportion of the copolyamide (PA-1) in the composition may vary within wide ranges and is, for example, in the range from 5% by weight to 95% by weight based on the overall composition, especially in the range from 20% by weight to 80% by weight based on the overall composition, preferably in the range from 25% by weight to 75% by weight, based in each case on the sum total of components (I) and (II).

Accordingly, the present invention also relates, in a further embodiment, to a composition as described above, wherein the proportion of the copolyamide (PA-1) in the composition is in the range from 5% to 95% by weight, based on the sum total of components (I) and (II).

In the context of the present invention, "at least one copolyamide" is understood to mean either exactly one copolyamide or a mixture of two or more copolyamides.

According to the invention, the composition (Z2) may comprise further polymers, for example further polyamides. In the context of the present invention, the composition (Z2) preferably does not comprise any further polymers aside from polyamides or copolyamides.

According to the invention, the copolyamide (PA-1) is obtainable by polymerizing the components (A) at least one lactam, and (B) a monomer mixture (M) comprising components (B1) at least one C32-C40 dimer acid and (B2) at least one C4-C12 diamine.

According to the invention, the ratio of components (A) and (B) used may vary within wide ranges. Suitable copolyamides are described, for example, in WO 2018/050487 A1. The copolyamide (PA-1) is preferably obtainable by polymerizing the following components:

(A) 15% to 84% by weight of at least one lactam, (B) 16% to 85% by weight of a monomer mixture (M) comprising the following components;

(B1) at least one C32-C40 dimer acid and (B2) at least one C4-C12 diamine;

where the percentages by weight of components (A) and (B) are each based on the sum total of the percentages by weight of components (A) and (B).

In the context of the present invention, the terms "component (A)" and "at least one lactam" are used synonymously and therefore have the same meaning.

The same applies to the terms "component (B)" and "a monomer mixture (M)". These terms are likewise used synonymously in the context of the present invention and therefore have the same meaning.

In the context of the present invention, "at least one lactam" means either exactly one lactam or a mixture of two or more lactams. Preference is given to exactly one lactam.

According to the invention, the at least one copolyamide is preferably prepared by polymerizing 15% to 84% by weight of component (A) and 16% to 85% by weight of component (B), preference being given to preparing the copolyamide by polymerizing 40% to 83% by weight of component (A) and 17% to 60% by weight of component (B), and the at least one copolyamide especially preferably being prepared by polymerizing 60% to 80% by weight of component (A) and 20% to 40% by weight of component (B), where the percentages by weight of components (A) and (B) are each based on the sum total of the percentages by weight of components (A) and (B).

Preferably, the sum total of the percentages by weight of components (A) and (B) is 100% by weight.

In the context of the present invention, the percentages by weight of components (A) and (B) are based on the percentages by weight of components (A) and (B) prior to the polymerization, i.e. when components (A) and (B) have not yet reacted with one another. During the polymerization, the weight ratio of components (A) and (B) may change.

According to the invention, the copolyamide is prepared by polymerizing components (A) and (B). The polymerization of components (A) and (B) is known per se to those skilled in the art. Typically, the polymerization of components (A) and (B) is a condensation reaction. During the condensation reaction, component (A) reacts with components (B1) and (B2) present in component (B) and if appropriate with component (B3) which is described further down and may likewise be present in component (B). This forms amide bonds between the individual components. Typically, component (A) is at least partly in open-chain form, i.e. as the amino acid, during the polymerization.

The polymerization of components (A) and (B) can take place in the presence of a catalyst. Suitable catalysts are all catalysts known to those skilled in the art that catalyze the polymerization of components (A) and (B). Such catalysts are known to those skilled in the art. Preferred catalysts are phosphorus compounds, for example sodium hypophosphite, phosphorous acid, triphenylphosphine or triphenyl phosphite.

The polymerization of components (A) and (B) forms the copolyamide, which therefore gains structural units derived from component (A) and structural units derived from component (B). Structural units derived from component (B) comprise structural units derived from components (B1) and (B2) and, optionally, from component (B3).

The polymerization of components (A) and (B) forms the copolyamide as a copolymer. The copolymer may be a random copolymer but it may likewise be a block copolymer.

In a block copolymer there is formation of blocks of units derived from component (B), and blocks of units derived from component (A), These alternate. In a random copolymer, there is alternation of structural units derived from component (A) with structural units derived from component (B). This alternation takes place randomly; for example, two structural units derived from component (B) may be followed by one structural unit derived from component (A), which is followed in turn by one structural unit derived from component (B), which is then followed by a structural unit comprising three structural units derived from component (A).

The at least one copolyamide (PA-1) is preferably a random copolymer.

The present invention therefore also provides a polymer film in which the at least one copolyamide is a random copolymer.

The preparation of the at least one copolyamide preferably comprises the following steps:

a) polymerizing components (A) and (B) to obtain at least one first copolyamide, b) pelletizing the at least one first copolyamide obtained in step a) to obtain at least one pelletized copolyamide, c) extracting the at least one pelletized copolyamide obtained in step b) with water to obtain at least one extracted copolyamide, d) drying the at least one extracted copolyamide obtained in step c) at a temperature (Tr) to obtain the at least one copolyamide.

Suitable reaction conditions are described, for example, in WO 2018/050487 A1.

The polymerization in step a) may take place in any reactor known to those skilled in the art. Preference is given to stirred tank reactors. It is also possible to use auxiliaries for improving reaction management that are known to those skilled in the art, for example defoamers such as polydimethylsiloxane (PDMS).

In step b), the at least one first copolyamide obtained in step a) may be pelletized by any methods known to those skilled in the art, for example by strand pelletization or underwater pelletization.

The extraction in step c) may be effected by any methods known to those skilled in the art.

During the extraction in step c), by-products formed in step a) during the polymerization of components (A) and (B) are typically extracted from the at least one pelletized copolyamide.

In step d), the at least one extracted copolyamide obtained in step c) is dried. Processes for drying are known to those skilled in the art. According to the invention, the at least one extracted copolyamide is dried at a temperature (Tr). The temperature (Tr) is preferably above the glass transition temperature ($TG_C$) of the at least one copolyamide and below the melting temperature ($TM_C$) of the at least one copolyamide.

The drying in step d) is typically effected for a period in the range from 1 to 100 hours, preferably in the range from 2 to 50 hours and especially preferably in the range from 3 to 40 hours.

The at least one copolyamide typically has a glass transition temperature ($TG_C$). The glass transition temperature ($TG_C$) is for example in the range from 20 to 50° C., preferably in the range from 23 to 47° C. and especially preferably in the range from 25 to 45° C., determined according to ISO 1 1357-2:2014.

Component (A) in the context of the present invention is at least one lactam. Lactams are known per se to those skilled in the art. Preference is given in accordance with the invention to lactams having 4 to 12 carbon atoms.

In the context of the present invention, "lactams" are understood to mean cyclic amides having preferably 4 to 12 carbon atoms, more preferably 5 to 8 carbon atoms, in the ring. Suitable lactams are selected for example from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6 lactam; ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

According to the invention, the lactams may be unsubstituted or at least monosubstituted. If at least monosubstituted lactams are used, the nitrogen atom and/or the ring carbon atoms thereof may bear one, two or more substituents selected independently from the group consisting of C5- to C10-alkyl, C5- to C5-cycloalkyl, and C5- to C10-aryl.

Suitable C5- to C10-alkyl substituents are, for example, methyl, ethyl, propyl, isopropyl, n-butyl, sec-butyl, and tert-butyl. A suitable C5- to C6-cycloalkyl substituent is, for example, cyclohexyl. Preferred C5- to C10-aryl substituents are phenyl and anthranyl.

Preference is given to using unsubstituted lactams, preference being given to γ-lactam (γ-butyrolactam), δ-lactam (δ-valerolactam) and ε-lactam (ε-caprolactam). Particular preference is given to δ-lactam (δ-valerolactam) and ε-lactam (ε-caprolactam), and ε-caprolactam is especially preferred.

According to the invention, component (B) is a monomer mixture (M). The monomer mixture (M) comprises components (B1), at least one C32-C40 dimer acid, and (B2), at least one C4-C12 diamine.

In the context of the present invention, a monomer mixture (M) is understood to mean a mixture of two or more monomers, where at least components (B1) and (B2) are present in the monomer mixture (M).

In the context of the present invention, the terms "component (B1)" and "at least one C32-C40 dimer acid" are used synonymously and therefore have the same meaning. The same applies to the terms "component (B2)" and "at least one C4-C12 diamine".

These terms are likewise used synonymously in the context of the present invention and therefore have the same meaning.

The monomer mixture (M) comprises, for example, in the range from 45 to 55 mol % of component (B1) and in the range from 45 to 55 mol % of component (B2), based in each case on the sum total of the molar percentages of components (B1) and (B2), preferably based on the total molar amount of component (B).

Preferably, component (B) comprises in the range from 47 to 53 mol % of component (B1) and in the range from 47 to 53 mol % of component (B2), based in each case on the sum total of the molar percentages of components (B1) and (B2), preferably based on the total molar amount of component (B).

More preferably, component (B) comprises in the range from 49 to 51 mol % of component (B1) and in the range from 49 to 51 mol % of component (B2), based in each case on the sum total of the molar percentages of components (B1) and (B2), preferably based on the total molar amount of component (B).

The sum total of the molar percentages of components (B1) and (B2) present in component (B) typically adds up to 100 mol %.

Component (B) may also additionally comprise a component (B3), at least one C4-C20 diacid. In the context of the present invention, the terms "component (B3)" and "at least one C4-C20 diacid" are used synonymously and therefore have the same meaning.

When component (B) additionally comprises component (B3), it is preferable that component (B) comprises in the range from 25 to 54.9 mol % of component (B1), in the range from 45 to 55 mol % of component (B2) and in the range from 0.1 to 25 mol % of component (B3), based in each case on the total molar amount of component (B).

More preferably, component (B) in that case comprises in the range from 13 to 52.9 mol % of component (B1), in the range from 47 to 53 mol % of component (B2) and in the range from 0.1 to 13 mol % of component (B3), based in each case on the total molar amount of component (B).

Further preferably, component (B) in that case comprises in the range from 7 to 50.9 mol % of component (B1), in the range from 49 to 51 mol % of component (B2) and in the range from 0.1 to 7 mol % of component (B3), based in each case on the total molar amount of component (B).

When component (B) additionally comprises component (B3), the molar percentages of components (B1), (B2) and (B3) typically add up to 100 mol percent.

The monomer mixture (M) may further comprise water.

Components (B1) and (B2) and optionally (B3) of component (B) can react with one another to obtain amides. This reaction is known per se to those skilled in the art. Therefore, component (B) may comprise components (B1) and (B2) and optionally component (B3) in fully reacted form, in partly reacted form or in unreacted form. Preferably, component (B) comprises components (B1), (B2) and optionally (B3) in unreacted form.

In the context of the present invention, "in unreacted form" thus means that component (B1) is present as the at least one C32-C40 dimer acid and component (B2) as the at least one C4-C12 diamine, and component (B3), if present, as the at least one C4-C20 diacid.

If components (B1) and (B2) and any (B3) present have at least partly reacted with one another, components (B1) and (B2) and any (B3) present are at least partly in amide form.

According to the invention, component (B1) is at least one C32-C40 dimer acid. In the context of the present invention, "at least one C32-C40 dimer acid" means either exactly one C32-C40 dimer acid or a mixture of two or more C32-C40 dimer acids.

Dimer acids are also referred to as dimer fatty acids. C32-C40 dimer acids are known per se to those skilled in the art and are typically prepared by dimerizing unsaturated fatty acids. This dimerization may be catalyzed by aluminas, for example. Suitable unsaturated fatty acids for preparing the at least one C32-C40 dimer acid are known to those skilled in the art and are, for example, unsaturated C16 fatty acids, unsaturated C18 fatty acids and unsaturated C20 fatty acids.

Component (B1) is therefore preferably prepared proceeding from unsaturated fatty acids selected from the group consisting of unsaturated C16 fatty acids, unsaturated C18 fatty acids and unsaturated C20 fatty acids, particular preference being given to the unsaturated C18 fatty acids. An example of a suitable unsaturated C16 fatty acid is palmitoleic acid ((9Z)-hexadeca-9-enoic acid).

Suitable unsaturated C18 fatty acids are, for example, selected from the group consisting of petroselinic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), alpha-linolenic acid ((9Z,12Z,15Z)-octadeca-9,12,15-trienoic acid), gamma-linolenic acid ((6Z,9Z,12Z)-octadeca-6,9,12-trienoic acid), calendulic acid ((8E,10E,12Z)-octadeca-8,10,12-trienoic acid), punicic acid ((9Z,11E,13Z)-octadeca-9,11,13-trienoic acid), alpha-eleostearic acid ((9Z,11E,13E)-octadeca-9,11,13-trienoic acid) and beta-eleostearic acid ((9E,11E,13E)-octadeca-9,11,13-trienoic acid). Particular preference is given to unsaturated cis fatty acids selected from the group consisting of petroselinic acid ((6Z)-octadeca-6-enoic acid), oleic acid ((9Z)-octadeca-9-enoic acid), elaidic acid ((9E)-octadeca-9-enoic acid), vaccenic acid (11E)-octadeca-11-enoic acid), linoleic acid ((9Z,12Z)-octadeca-9,12-dienoic acid).

Suitable unsaturated C20 fatty acids are for example selected from the group consisting of gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,14Z,17Z)-eicosa-5,8,11,14,17-pentaenoic acid).

Component (B1) is especially preferably at least one C36 dimer acid.

The at least one C36 dimer acid is preferably prepared proceeding from unsaturated cis fatty acids. The C36 dimer acid is more preferably prepared proceeding from cis fatty acids selected from the group consisting of petroselinic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-dienoic acid).

The preparation of component (B1) from unsaturated fatty acids can additionally form trimer acids; residues of unreacted unsaturated fatty acid may also remain.

The formation of trimer acids is known to those skilled in the art.

Preferably in accordance with the invention, component (B1) comprises at most 0.5% by weight of unreacted unsaturated fatty acid and at most 0.5% by weight of trimer acid, more preferably at most 0.2% by weight of unreacted unsaturated fatty acid and at most 0.2% by weight of trimer acid, based in each case on the total weight of component (B1).

Dimer acids (also known as dimerized fatty acids or dimer fatty acids) thus refer generally, and especially in the context of the present invention, to mixtures that are prepared by oligomerization of unsaturated fatty acids. They are preparable, for example, by catalytic dimerization of plant-derived unsaturated fatty acids, using unsaturated C16 to C20 fatty acids in particular as starting materials. The bond formation proceeds primarily by the Diels-Aider mechanism, and results, depending on the number and position of the double bonds in the fatty acids used to prepare the dimer acids, in mixtures of primarily dimeric products having cycloaliphatic, linear aliphatic, branched aliphatic, and also C6 aromatic hydrocarbon groups between the carboxyl groups. Depending on the mechanism and/or any subsequent hydrogenation, the aliphatic radicals may be saturated or unsaturated and the proportion of aromatic groups may also vary. The radicals between the carboxylic acid groups then comprise 32 to 40 carbon atoms for example. They are preferably prepared using fatty acids having 18 carbon atoms, so that the dimeric product thus has 36 carbon atoms. The radicals which join the carboxyl groups of the dimer fatty acids preferably comprise no unsaturated bonds and no aromatic hydrocarbon radicals.

In the context of the present invention, preference is thus given to using C18 fatty acids in the preparation. It is particularly preferable to use linolenic acid, linoleic acid and/or oleic acid.

Depending on reaction management the above-described oligomerization affords mixtures which comprise primarily dimeric, but also trimeric, molecules and also monomeric molecules and other by-products. Purification by distillation is customary. Commercial dimer acids generally comprise at least 80% by weight of dimeric molecules, up to 19% by weight of trimeric molecules, and not more than 1% by weight of monomeric molecules and of other by-products.

It is preferable to use dimer acids that consist to an extent of at least 90% by weight, preferably to an extent of at least 95% by weight, most preferably to an extent of at least 98% by weight, of dimeric fatty acid molecules.

The proportions of monomeric, dimeric, and trimeric molecules and of other by-products in the dimer acids may be determined by gas chromatography (GC), for example. The dimer acids are converted to the corresponding methyl esters by the boron trifluoride method (cf. DIN EN ISO 5509) before GC analysis and then analyzed by GC.

In the context of the present invention it is thus a fundamental feature of "dimer acids" that production thereof comprises oligomerization of unsaturated fatty acids. This oligomerization gives rise principally, in other words to an extent preferably of at least 80% by weight, more preferably to an extent of at least 90% by weight, even more preferably to an extent of at least 95% by weight and more particularly to an extent of at least 98% by weight, to dimeric products. The fact that the oligomerization thus forms predominantly dimeric products comprising exactly two fatty acid molecules justifies this designation, which is in any case commonplace. An alternative expression for the relevant term "dimer acids" is thus "mixture comprising dimerized fatty acids".

The dimer acids to be used are obtainable as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1012, Empol 1061, and Empol 1062 from BASF SE, and Unidyme 10 and Unidyme TI from Arizona Chemical.

Component (B1) has, for example, an acid number in the range from 190 to 200 mg KOH/g.

According to the invention, component (B2) is at least one C4-C12 diamine. In the context of the present invention, "at least one C4-C12 diamine" means either exactly one C4-C12 diamine or a mixture of two or more C4-C12 diamines. In the context of the present invention, "C4-C12 diamine" is understood to mean aliphatic and/or aromatic compounds having four to twelve carbon atoms and two amino groups (–NH2 groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Such substituents are for example alkyl or cycloalkyl substituents. These are known per se to those skilled in the art. The at least one C4-C12 diamine is preferably unsubstituted.

Examples of suitable components (B2) are selected from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Preferably, component (B2) is selected from the group consisting of tetramethylenediamine, pentamethylenediamine, hexamethylenediamine, decamethylenediamine and dodecamethylenediamine.

According to the invention, any component (B3) present in component (B) is at least one C4-C20 diacid. In the context of the present invention, "at least one C4-C20 diacid" means either exactly one C4-C20 diacid or a mixture of two or more C4-C20 diacids.

In the context of the present invention, "C4-C20 diacid" is understood to mean aliphatic and/or aromatic compounds having two to eighteen carbon atoms and two carboxyl groups (—COOH groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A) and (B). Such substituents are for example alkyl or cycloalkyl substituents. These are known to those skilled in the art. The at least one C4-C20 diacid is preferably unsubstituted.

Suitable components (B3) are for example selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid tetradecanedioic acid and hexadecanedioc acid.

Preferably, component (B3) is selected from the group consisting of pentanedioic acid (glutaric acid), hexanedioic acid (adipic acid), decanedioic acid (sebacic acid) and dodecanedioic acid.

According to the invention, the composition (Z2) can be produced, for example, by mixing the individual components, for example the polyamide (PA1) and the flame retardant (F1), for example in a suitable apparatus such as an extruder or a kneader. The composition (Z2) can be produced here under conditions known per se.

According to the invention, it is possible to use further additives, for example further flame retardants or fillers. Suitable fillers, plasticizers or further flame retardants are known per se to the person skilled in the art.

In a further embodiment, the present invention also relates to a composition (Z2) as described above, wherein the composition comprises at least one filler.

According to the invention, the composition (Z2) comprises a flame retardant (F1) selected from the group consisting of melamine cyanurates, magnesium hydroxide and phosphorus-containing flame retardants.

Also suitable in the context of the present invention, for example, are mixtures of different flame retardants, for example mixtures comprising one or more phosphorus-containing flame retardants.

Accordingly, the present invention, in a further embodiment, also relates to a composition as described above, wherein the composition comprises at least one first phosphorus-containing flame retardant (F1) selected from the group consisting of derivatives of phosphoric acid and derivatives of phosphonic acid, and at least one further phosphorus-containing flame retardant (F2) selected from the group consisting of derivatives of phosphinic acid.

Suitable flame retardants are, for example, also metal hydroxides. In the event of fire, metal hydroxides release exclusively water and therefore do not form any toxic or corrosive smoke gas products. Furthermore, these hydroxides are capable of reducing smoke gas density in the event of fire. However, a disadvantage of these substances is that, in some cases, they promote the hydrolysis of thermoplastic polyurethanes and also affect the oxidative aging of the polyurethanes.

Suitable hydroxides in the context of the present invention are preferably those of magnesium, calcium, zinc and/or aluminum or mixtures thereof. More preferably, the metal hydroxide is selected from the group consisting of aluminum hydroxides, aluminum oxide hydroxides, magnesium hydroxide and a mixture of two or more of these hydroxides.

The compositions of the invention may also comprise a phosphorus-containing flame retardant. According to the invention, it is possible in principle to use any known phosphorus-containing flame retardants for thermoplastic polyurethanes.

Preference is given, in the context of the present invention, to using derivatives of phosphoric acid, derivatives of phosphonic acid or derivatives of phosphinic acid or mixtures of two or more of these derivatives in a further preferred embodiment, the phosphorus-containing flame retardant is liquid at 21° C.

Preferably, the derivatives of phosphoric acid, phosphonic acid or phosphinic acid are salts with an organic or inorganic cation or organic esters. Organic esters are derivatives of the phosphorus-containing acids in which at least one oxygen atom bonded directly to the phosphorus has been esterified with an organic radical. In a preferred embodiment the organic ester is an alkyl ester, and in another preferred embodiment an aryl ester. More preferably, all hydroxyl groups of the corresponding phosphorus-containing acid have been esterified.

Suitable organic phosphate esters are, for example, the triesters of phosphoric acid, such as trialkyl phosphates and especially triaryl phosphates, for example resorcinol bis (diphenyi phosphate).

Especially suitable in accordance with the invention are salts of the respective derivatives of phosphoric acid, phosphonic: acid or phosphinic acid, more preferably phosphinate salts. Suitable examples in the context of the present invention are melamine polyphosphate or diethylaluminum phosphinate.

In addition, it is also possible in the context of the present invention to use nitrogen-containing flame retardants. According to the invention, it is possible in principle to use any known nitrogen-containing flame retardants for thermoplastic polyurethanes.

Suitable flame retardants in the context of the present invention are, for example, also melamine derivatives such as, in particular, melamine polyphosphate or melamine cyanurate.

In the context of the present invention, it is also possible that the composition, as well as the thermoplastic polyurethane, comprises mixtures of various flame retardants, for example a melamine derivative and a derivative of phosphoric acid, or a melamine derivative and a derivative of phosphinic acid, or a melamine derivative, a derivative of phosphoric acid and a derivative of phosphinic acid.

The melamine derivative may preferably be melamine cyanurate. Accordingly, the present invention, in a further embodiment, may also relate to a composition comprising, as well as the thermoplastic polyurethane, for example, a melamine cyanurate and a derivative of phosphoric acid, or a melamine cyanurate and a derivative of phosphinic acid, or a melamine cyanurate, a derivative of phosphoric acid and a derivative of phosphinic acid. For example, the composition of the invention comprises at least one thermoplastic polyurethane, at least melamine cyanurate, at least one first phosphorus-containing flame retardant (F1) selected from the group consisting of derivatives of phosphoric acid and derivatives of phosphonic acid and at least one further phosphorus-containing flame retardant (F2) selected from the group consisting of derivatives of phosphinic acid.

Preferably, the composition, aside from the melamine cyanurate, the at least one phosphorus-containing flame retardant (F1) and the at least one phosphorus-containing flame retardant (F2), does not comprise any further flame retardants. Further preferably, the composition of the invention comprises melamine cyanurate, exactly one phosphorus-containing flame retardant (F1) selected from the group consisting of derivatives of phosphoric acid and derivatives of phosphonic, acid and exactly one phosphorus-containing flame retardant (F2) selected from the group consisting of derivatives of phosphinic acid.

Accordingly, the present invention, in a further embodiment, also relates to a composition as described above, wherein the phosphorus-containing flame retardant (F1) is a phosphinate.

In a further embodiment, the present invention also further relates to a composition as described above, wherein the phosphinate is selected from the group consisting of aluminum phosphinates or zinc phosphinates.

In addition, the present invention, in a further embodiment, also relates to a composition as described above, wherein the phosphorus-containing flame retardant (F2) is a phosphoric ester.

In a further embodiment, the present invention also relates to a composition as described above, wherein the flame retardant (F1) is selected from the group consisting of resorcinol bis(diphenyl phosphate) (RDP), bisphenol A bis (diphenyl phosphate) (BDP) and diphenyl cresyl phosphate (DPK).

The proportion of the flame retardant (F) in the composition is, for example, in the range from 2.5% to 40% by weight, based on the overall composition, preferably in the range from 5% to 30% by weight, based on the overall composition, more preferably in the range from 10% to 20% by weight, based on the overall composition.

In a further embodiment, the present invention accordingly also relates to a composition as described above, wherein the flame retardant (F) is present in an amount in the range from 2.5% to 40% by weight, based on the overall composition.

According to the invention, the composition may also comprise further components, for example including further flame retardants. Suitable additives and flame retardants are known per se to the person skilled in the art and are described, for example, in EP 2.878630 B1 or WO 2017/063841. In principle, the flame retardants disclosed in the documents cited may be used in the context of the present invention, and it is also possible to use mixtures of the flame retardants specified therein.

Suitable flame retardants are additionally commercially available organic halogen compounds with synergists or commercially available organic nitrogen compounds or organic/inorganic phosphorus compounds, which are used individually or in a mixture with one another. It is also possible to use mineral flame-retardant additives such as magnesium hydroxide or Ca Mg carbonate hydrates. Preferred halogenated, especially brominated and chlorinated, compounds include ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ether. Suitable phosphorus compounds include, for example, the phosphorus compounds disclosed in WO-A 98/17720, preferably red phosphorus, metal phosphinates, especially aluminum phosphinate and zinc phosphinate, metal phosphonates, especially aluminum phosphonate, calcium phosphonate and zinc phosphonate, derivatives of the 9,10-dihydro-9-oxa-10-phosphaphenanthrene 10-oxides (DOPO derivatives), triphenyl phosphate (TPP), resorcinol bis(diphenyl phosphate) (RDP), including oligomers, and bisphenol A bis(diphenyl phosphate) (BDP) including oligomers, and also zinc bis(diethylphosphinate), aluminum tris(diethylphosphinate), melamine phosphate, melamine pyrophosphate, melamine polyphosphate, melamine poly(aluminum phosphate), melamine poly(zinc phosphate) or phenoxyphosphazene oligomers and (diphenyl phosphate) (RDP), including oligomers, and mixtures thereof.

Useful nitrogen compounds include especially melamine or melamine cyanurate, reaction products of trichlorotriazine, piperazine and morpholine as per CAS No. 1078142-02-5 (e.g. MCA PPM Triazine HF from MCA Technologies GmbH, Biel-Benken, Switzerland). Suitable synergists are preferably antimony compounds, especially antimony trioxide or antimony pentoxide, zinc compounds, tin compounds, especially zinc stannate, or borates, especially zinc borates.

It is also possible to add what are called carbon formers and tetrafluoroethylene polymers to the flame retardant. Among the halogenated flame retardants, particular preference is given to using brominated polystyrenes, for example Firemaster® PBS64 (Great Lakes, West Lafayette, USA) or brominated phenylene ethers, each especially preferably in combination with antimony trioxide and/or zinc stannates as synergists. Among the halogen-free flame retardants, particular preference is given to using aluminum tris(diethylphosphinate) in combination with melamine polyphosphate (e.g. Melapur® 200/70 from BASF SE, Ludwigshafen, Germany) and zinc borate (e.g. Firebrake® 500 or Firebrake® ZB from RioTinto Minerals, Greenwood Village, USA) or aluminum tris(diethylphosphinate) in combination with aluminum phosphonate and/or aluminum phosphonate hydrate.

For example, the flame retardant used is aluminum tris (diethylphosphinate) (e.g. Exolit® OP1230 from Clariant International Ltd. Muttenz, Switzerland) (CAS No. 225789-38-8) in a combination with melamine polyphosphate (Melapur® 200/70) and zinc borate (Firebrake® 500).

Suitable flame retardants in the context of the present invention are phosphinic salts or polymers thereof.

Suitable flame retardants are additionally nitrogen-containing flame retardants such as melamine compounds. Suitable examples are melamine cyanurates, for example reaction products of preferably equimolar amounts of melamine and cyanuric acid or isocyanuric acid.

Further suitable compounds (often also referred to as salts or adducts) are melamine sulfate, melamine, melamine borate, oxalate, phosphate prim., phosphate sec. and pyrophosphate sec., melamine neopentyl glycol borate, and polymeric melamine phosphate (CAS No. 56386-64-2 and 218768-84-4).

Advantageously in accordance with the invention, melamine cyanurate is used, the particle size distribution of which has, for example, a d50 of less than 4.5 μm, preferably less than 3 μm. A d50 value is generally understood by those skilled in the art to mean the particle size value at which 50% of the particles have a smaller particle size and 50% a greater particle size. Particle size distribution is typically determined by laser scattering (by a method based on ISO 13320).

The present invention also relates to processes for producing the compositions of the invention.

In one embodiment, the compositions of the invention are produced by processing the copolyamide and flame retardant and any further components of the composition in one step. In other preferred embodiments, for production of the compositions of the invention, a reaction extruder, a belt system or other suitable apparatus is firstly used to produce a copolyamide, preferably in pellet form, into which at least one further flame retardant is then introduced in at least one further step, or else two or more steps.

The mixing of the components is effected, for example, in a mixing unit which is preferably an internal kneader or an extruder, preferably a twin-screw extruder. In another preferred embodiment using an extruder, the flame retardant introduced is liquid at the temperature that exists downstream of the addition thereof into the extruder in flow direction.

The composition of the invention may further comprise a filler (FS1). According to the invention, the chemical nature and form of the filler (FS1) may vary within wide ranges, provided that compatibility with the composition (Z2) is sufficient. The filler (FS1) should be chosen here such that the form and particle size of the filler enable sufficient miscibility and homogeneous distribution in the composition.

Suitable fillers are for example glass fibers, glass beads, carbon fibers, aramid fibers, potassium titanate fibers, fibers of liquid-crystal polymers, organic fibrous fillers or inorganic reinforcing materials. Organic fibrous fillers are for example cellulose fibers, hemp fibers, sisal or kenaf. Inorganic reinforcing materials are, for example, ceramic fillers, such as aluminum nitride and boron nitride, or mineral fillers, such as asbestos, talc, wollastonite, microvit, silicates, chalk, calcined kaolins, mica and quartz flour. Preferably in accordance with the invention, the filler (FS1) is selected from the group consisting of glass fibers, carbon fibers, aramid fibers, potassium titanate fibers, fibers of liquid-crystalline polymers, metal fibers, polyester fibers, polyimide fibers, organic fibrous fillers and inorganic fibrous fillers.

In a further embodiment, the present invention accordingly also relates to a composition as described above, wherein the filler (FS1) is selected from the group consisting of glass fibers, carbon fibers, aramid fibers, potassium titanate fibers, fibers of liquid-crystalline polymers, metal fibers, polyester fibers, polyamide fibers, organic fibrous fillers and inorganic fibrous fillers.

Fibrous fillers are preferred in the context of the present invention. In a further embodiment, the present invention accordingly also relates to a composition as described above, wherein the filler (FS1) is fibrous.

The dimensions of the fillers used may vary within customary ranges. The filler used preferably has a length in the range from 3 mm to 4 mm and a diameter in the range from 1 μm to 20 μm, each determined in accordance with ASTM D578-98. In a further embodiment, the present invention accordingly also relates to a composition as described above, wherein the filler (FS1) has a length in the range from 3 mm to 4 mm and a diameter in the range from 1 μm to 20 μm, each determined in accordance with ASTM D578-98.

The fillers, for example the fibrous fillers, may have been pretreated for better compatibility with the thermoplastic, for example with a silane compound.

Preference is given to using inorganic fibrous fillers. When using inorganic fibrous fillers, a greater reinforcing effect and a higher heat resistance are observed.

According to the invention, the composition may also comprise two or more fillers.

The proportion of the filler (FS1) in the composition is, for example, in the range from 40% to 60% by weight, based on the overall composition, preferably in the range from 45% to 55% by weight, based on the overall composition, more preferably in the range from 48% to 52% by weight, based on the overall composition.

In a further embodiment, the present invention accordingly also relates to a composition as described above, wherein the filler (FS1) is present in an amount in the range from 40% to 60% by weight, based on the overall composition.

In the context of the present invention, the sum total of the constituents of the composition adds up to 100% by weight, unless stated otherwise.

According to the invention, the composition may comprise further components, for example demolding aids, UV protection, antioxidant or color pigments.

In a further aspect, the present invention also relates to a process for producing a composition (Z-2). The present invention relates to a process for producing a composition (Z-2), comprising the following steps:

(a) providing
  - (I) a copolyamide (PA-1), prepared by polymerizing at least one lactam, and a monomer mixture (M) comprising components (B1) at least one C32-C40 dimer acid and (B2) at least one C4-C12 diamine; and
  - (II) a flame retardant selected from the group consisting of melamine cyanurates, magnesium hydroxide and phosphorus-containing flame retardants, (b) mixing components (I) and (II).

This process of the invention comprises at least steps (a) and (b). The process may comprise further steps, for example drying steps or temperature adjustments. According to the invention, it is also possible to add further components, for example the aforementioned auxiliaries and additives.

In a further aspect, the present invention accordingly relates to a process as described above, wherein the components used are dried, for example at a temperature in the range from 80 to 100° C. For example, the drying can be effected at a temperature in the range from 80 to 100° C. for a period of 2 to 4 hours.

According to the invention, in step (b), the copolyamide (PA-1) and the flame retardant are mixed. This can be effected in apparatuses known per se to the person skilled in the art, for example in an extruder. Suitable extruders and process conditions are known per se to the person skilled in the art. For example, the mixing, in an extruder can be effected at a temperature in the range from 180 to 240° C., preferably at a temperature in the range from 190° C. to 230° C., more preferably at a temperature in the range from 200° C. to 225° C.

Suitable dwell times in the extruder are, for example, in the range from 5 to 20 minutes, preferably 10 to 15 minutes.

With regard to the preferred embodiments, reference is made to the above details of the components used with preference.

Suitable processes for producing the composition are known per se to the person skilled in the art. In the context of the present invention, processes known per se are typically used for compounding.

For example, the composition can be produced in an extruder in a manner known per se, for example in a twin-screw extruder. According to the invention, it is preferable to add the filler in portions, for example a portion at the extruder intake and a further portion at a second dosage site, for example a side feeder. The temperature here is preferably in the range from 160 to 230° C. In the context of the present invention, the extruder can be operated, for example, at a speed in the range from 150 to 300 revolutions per minute.

The present invention further relates to a composition obtained or obtainable by a process of the invention.

The present invention also relates to the use of the composition (Z2) of the invention or of a composition obtained or obtainable by a process of the invention for production of a shaped article.

In the context of the present invention, the composition of composition (Z-2) may vary within wide ranges. Typically, the composition (Z-2) comprises the flame retardant in an amount in the range from 2.5% to 40% by weight, based on the overall composition, preferably in the range from 5% to 30% by weight, based on the overall composition, more preferably in the range from 10% to 20% by weight, based on the overall composition.

In a further embodiment, the present invention accordingly also relates to a composition (Z-2) as described above, wherein the flame retardant (F) is present in an amount in the range from 2.5% to 40% by weight, based on the overall composition.

In a further aspect, the present invention also relates to a composition (Z-3) comprising at least (a) a copolyamide (PA-1), prepared by polymerization of
  (A) at least one lactam, and
  (B) a monomer mixture (M) comprising the following components:
    (B1) at least one C32-C40 dimer acid and
    (B2) at least one C4-C12 diamine;
    and
(b) a filler (FS).

With regard to the preferred embodiments, reference is made to the above details of the components used with preference.

Suitable copolyamides (PA-1) and suitable fillers (FS) are those described above.

In the context of the present invention, the composition of composition (Z-3) may vary within wide ranges. According to the invention, the composition may also comprise two or more fillers.

The proportion of the filler (FS) in the composition is, for example, in the range from 40% to 60% by weight, based on the overall composition, preferably in the range from 45% to 55% by weight, based on the overall composition, more preferably in the range from 48% to 52% by weight, based on the overall composition.

In a further embodiment, the present invention accordingly also relates to a composition as described above, wherein the filler (FS) is present in an amount in the range from 40% to 60% by weight, based on the overall composition.

According to the invention, the composition (Z-3) may also comprise further components, for example flame retardants or other customary additives.

Suitable processes for producing the composition are known per se to the person skilled in the art. In the context of the present invention, processes known per se are typically used for compounding.

In a further aspect, the present invention also relates to a process for producing a composition (Z-3), comprising the steps of (a) providing
  (a) a copolyamide (PA-1), prepared by polymerizing at least one lactam, and a monomer mixture (M) comprising components (B1) at least one C32-C40 dimer acid and (B2) at least one C4-C12 diamine; and
  (b) a filler (FS),
(b) mixing components (a) and (b).

With regard to suitable process conditions, reference is made to the details above, which are correspondingly applicable.

In a further aspect, the present invention also further relates to shaped articles comprising, a composition of the invention according to or a composition obtained or obtainable by a process of the invention.

The present invention also relates to the use of the composition of the invention comprising at least one flame-retardant thermoplastic polyurethane as described above, for production of coatings, damping elements, bellows, films or fibers, molded articles, floors for buildings and transport, random-laid webs, preferably seals, rollers, shoe soles, hoses, cables, cable connectors, cable sheathings, cushions, laminates, profiles, belts, saddles, foams, plug connectors, trailing cables, solar modules, automotive trim. Use for the production of cable sheathings is preferred. Production is preferably effected from pellet materials by injection molding, calendering, powder sintering or extrusion and/or by additional foaming of the composition of the invention.

On account of their good mechanical properties and good thermal characteristics, the thermoplastic polyurethanes of the invention and the compositions of the invention are especially suitable for production of films, moldings, wheels/rollers, fibers, automotive trim, hoses, cable plugs, bellows, trailing cables, cable sheathings, seals, belts or damping elements.

The present invention thus also provides films, moldings, wheels/rollers, fibers, automotive trim, hoses, cable plugs, bellows, trailing cables, cable sheathings, seals, belts or damping elements comprising a thermoplastic polyurethane as described above or a composition as described above.

Further embodiments of the present invention can be found in the description and the examples. It will be appreciated that the features of the subject matter/process of the invention or of the uses of the invention recited hereinabove and elucidated hereinbelow may be used not only in the combination specified in each case but also in other combinations without departing from the scope of the invention. Thus, for example, the combination of a preferred feature with a particularly preferred feature, or of a feature not characterized further with a particularly preferred feature etc., is also encompassed implicitly even if this combination is not mentioned explicitly.

Illustrative embodiments of the present invention are detailed hereinbelow, but are not intended to limit the present invention. In particular, the present invention also encompasses those embodiments that result from the dependency references and hence combinations specified hereinbelow.

1. A composition (Z-2) comprising at least
   (i) a copolyamide (PA-1), prepared by polymerization of
      (A) at least one lactam, and
      (B) a monomer mixture (M) comprising the following components:
         (B1) at least one C32-C40 dimer acid and
         (B2) at least one C4-C12 diamine;
         and
   (ii) a flame retardant (F1) selected from the group consisting of melamine cyanurates, magnesium hydroxide and phosphorus-containing flame retardants.
2. The composition according, to embodiment 1, wherein the proportion of the copolyamide (PA-1) in the composition is in the range from 5% to 95% by weight, based on the sum total of components (i) and (ii).
3. The composition according to either of embodiments 1 and 2, wherein the composition comprises at least one first phosphorus-containing flame retardant (F1) selected from the group consisting of derivatives of phosphoric acid and derivatives of phosphonic acid and at least one further phosphorus-containing flame retardant (F2) selected from the group consisting of derivatives of phosphinic acid.
4. The composition according to embodiment 3, wherein the phosphorus-containing flame retardant (F1) is a phosphinate.
5. The composition according to embodiment 4, wherein the phosphinate is selected from the group consisting of aluminum phosphinates or zinc phosphinates.
6. The composition according to any of embodiments 3 to 5, wherein the phosphorus-containing flame retardant (F2) is a phosphoric ester.
7. The composition according to any of embodiments 3 to 6, wherein the flame retardant (F1) is selected from the group consisting of resorcinol bis(diphenyl phosphate) (RDP), bisphenol A bis(diphenyl phosphate) (BDP) and diphenyl cresyl phosphate (DPK).
8. A process for producing a composition (Z-2), comprising the steps of
   (a) providing
      (I) a copolyamide (PA-1), prepared by polymerizing at least one lactam, and a monomer mixture (M) comprising components (B1) at least one C32-C40 dimer acid and (B2) at least one C4-C12 diamine; and
      (II) a flame retardant selected from the group consisting of melamine cyanurates, magnesium hydroxide and phosphorus-containing flame retardants,
   (b) mixing components (i) and (ii).
9. A composition (Z-3) comprising at least
   (a) a copolyamide (PA-1), prepared by polymerization of
      (A) at least one lactam, and
      (B) a monomer mixture (M) comprising the following components:
         (B1) at least one C32-C40 dimer acid and
         (B2) at least one C4-C12 diamine;
         and
   (b) a filler (FS).
10. The composition according to embodiment 9, wherein the proportion of the copolyamide (PA-1) in the composition is in the range from 5% to 95% by weight, based on the sum total of components (a) and (b).
11. A process for producing a composition (Z-3), comprising the steps of
   (a) providing
      (a) a copolyamide (PA-1), prepared by polymerizing at least one lactam, and a monomer mixture (M) comprising components (B1) at least one C32-C40 dimer acid and (B2) at least one C4-C12 diamine; and
      (b) a filler (FS),
   (b) mixing components (a) and (b).
12. The use of a composition according to any of embodiments 1 to 7 and 9 and 10 for production of shaped articles.
13. A shaped article comprising a composition according to any of embodiments 1 to 7 and 9 and 10.

The examples that follow serve to illustrate the invention, but are in no way limiting in respect of the subject matter of the present invention.

Examples

1. Materials Used

Ultramid RX2298: Copolymer of nylon-6 and nylon-6,36 (PA 6/6.36) from BASF SE, 67056 Ludwigshafen, Germany, sold under the Ultramid RX 2298 brand name, with an MVR (275° C./5 kp) 115 cm3/10', a viscosity number to DIN 5372.7 (0.005 g/ml H2SO4) of 28 ml/g, a melting temperature (DSC, ISO 11357) of 200° C. and a density of 1.054 g/ml.

Exolit OP 1230: Aluminum diethylphosphinate, CAS #: 225789-38-8, Clariant Produkte (Germany) GmbH, Chemiepark Knapsack, 50351 Hürth, water content % (w/w) <0.2, average particle size (D50) 2.0-40 μm.

Ultrabatch 590A: Mixture of 63% by weight of aluminum hypophosphite, CAS 7784-22-7 and 37% by weight of melamine cyanurate, CAS 37640-57-6, Italmatch Chemicals S.p.A., Via Pietro Chiesa 7/13 (piano 8°), Torri Piane-SanBenigno, 16149 Genoa, Italy, phosphorus content (%) 26-27, nitrogen content (%) 17.6-18.6, average particle size (D50) 3.4 μm, water content % (w/w)<0.2.

Fyrolflex RDP: Resorcinol bis(diphenyl phosphate), CAS #: 125997-21-9, Supresta Netherlands B.V., Office Park De Hoef, Hoefseweg 1, 3821 AE Amersfoort, the Netherlands, viscosity at 25° C.=700 mPas, acid number<0.1 mg KOH/g, water content % (w/w)<0.1.

Melapur MC 15 ED: Melamine cyanurate (1,3,5-triazine-2,4,6(1H,3H,5H)-trione, compound with 1,3,5-triazine-2,4,6-triamine (1:1)), CAS #: 37640-57-6, BASE SE, 67056 Ludwigshafen, GERMANY, particle size D99%</=50 μm, D50%<=4.5 μm, water content % (w/w)<0.2.

Melapur MC 200/70: Melamine polyphosphate (nitrogen content 42-44 wt %, phosphorus content 12-14 wt %), CAS #: 218768-84-4, BASF SE, 67056 Ludwigshafen, GERMANY, particle size D99%</=70 μm, average particle diameter D50%<=10 μm, water content % (w/w)<0.3.

2. Production of the Materials

The tables that follow list compositions in which the individual constituents are stated in parts by weight (PW). The mixtures were each produced with a Berstorff ZE 40 A twin-screw extruder with screw length 35 D divided into 10 barrel sections. Pelletization was effected using standard underwater pelletization apparatus from Gala (UWG).

TABLE 1

| | Example No. | | | | | | | |
|---|---|---|---|---|---|---|---|---|
| | 1 (CE) | 2 (IE) | 3 (IE) | 4 (IE) | 5 (IE) | 6 (CE) | 7 (IE) | 8 (IE) |
| RX 2298 Polyamide | 100 | 80 | 80 | 80 | 80 | 80 | 80 | 80 |
| Exolit OP 1230 | — | 20 | — | — | — | | 10 | 10 |
| Ultrabatch 590A | — | — | 20 | — | — | — | — | — |
| Melapur MC 15 ED | — | — | — | 20 | — | — | 10 | — |
| Melapur MPP 200/70 | — | — | — | — | 20 | — | — | 10 |
| Fyrolflex RDP | — | — | — | — | — | 20 | — | |
| | 100 | 100 | 100 | 100 | 100 | 100 | 100 | 100 |

Pure Ultramid RX 2298 was not extruded; the films and injection moldings were produced with the original pellets. Composition 6 was not producible. There were crosslinking reactions on addition of the Fyrolflex RDP.

3. Determination of Properties 3.1 Determination of MFR

TABLE 2

| | | Example No. | | | | | | |
|---|---|---|---|---|---|---|---|---|
| | | 1 (CE) | 2 (IE) | 3 (IE) | 4 (IE) | 5 (IE) | 7 (IE) | 8 (IE) |
| [g/10 min] | DIN EN ISO 1133 | | 70 | 79 | 83 | 16 | 72 | 70 |

3.2 Production of Films and Mechanical Properties of the Films

Density, Shore hardness, tensile strength, the propagation resistance, abrasion and elongation at break were determined on films having a thickness of 1.6 mm. The films were extruded with an Arenz single-screw extruder having a three-zone screw with a mixing section (screw ratio 1:3). The films were produced at low processing temperatures.

TABLE 3

| | Zone temperatures | | | | | | | Intake | Melt temp. | | Speed | Flow rate | Draw rate |
|---|---|---|---|---|---|---|---|---|---|---|---|---|---|
| Sample | 1 | 2 | 3 | 4 | 5 | 6 | 7 | ° C. | ° C. | Pressure | 1/min | % | m/min |
| 1 (CE) | 185 | 195 | 200 | 215 | 225 | 225 | 225 | 24 | 210 | 6 | 33 | 20 | 0.4 |
| 2 (IE) | 180 | 190 | 200 | 210 | 210 | 210 | 210 | 26 | 209 | 9 | 35 | 30 | 0.4 |
| 3 (IE) | 185 | 195 | 205 | 215 | 215 | 215 | 215 | 26 | 215 | 9 | 33 | 20 | 0.4 |
| 4 (IE) | 185 | 195 | 205 | 215 | 225 | 225 | 225 | 24 | 217 | 6 | 33 | 25 | 0.4 |
| 5 (IE) | 185 | 195 | 205 | 215 | 225 | 225 | 225 | 24 | 224 | 39 | 33 | 35 | 0.4 |
| 7 (IE) | 185 | 195 | 205 | 215 | 225 | 225 | 225 | 24 | 220 | 9 | 32 | 25 | 0.4 |
| 8 (IE) | 185 | 195 | 205 | 215 | 225 | 225 | 225 | 24 | 220 | 11 | 32 | 35 | 0.4 |

The results of the measurements on the films are summarized in table 4.

TABLE 4

| | | | Example No. | | | | | | |
|---|---|---|---|---|---|---|---|---|---|
| | | | 1 (CE) | 2 (IE) | 3 (IE) | 4 (IE) | 5 (IE) | 7 (IE) | 8 (IE) |
| Density | [g/cm$^3$] | DIN EN ISO 1183-1, A | 1.06 | 1.14 | 1.16 | 1.14 | 1.15 | 1.13 | 1.13 |
| Shore | [D] | DIN ISO 7619-1 | 76 | 76 | 79 | 76 | 79 | 78 | 78 |
| Tensile strength | [MPa] | DIN EN ISO 527 | 59 | 30 | 32 | 35 | 37 | 33 | 31 |
| Elongation at break | [%] | DIN EN ISO 527 | 460 | 250 | 200 | 300 | 300 | 280 | 260 |
| Tear propagation resistance | [kN/m] | DIN ISO 34-1, B (b) | 251 | 149 | 171 | 158 | 166 | 157 | 155 |
| Abrasion | [mm$^3$] | DIN ISO 4649 | 38 | 72 | 60 | 82 | 41 | 62 | 68 |

After production, the films were subjected to heat treatment at 100° C., for 20 h. Thereafter, the films remained under standard climatic conditions for 3 days before the mechanical properties were determined. All compositions of the invention have very good mechanical properties.

3.3 Production of Injection Moldings and Mechanical Properties of the Injection-Molded Parts The test specimens for the cone measurements with dimensions of 100×100×5 mm and the test specimens for the determination of the mechanical properties were injection-molded on an Arburg 520S with a screw diameter of 30 mm. The materials were injection-molded at low temperatures. By way of example, the injection molding conditions are specified for the production of the test specimens for the cone measurements.

TABLE 5

| Experiment | Back-pressure | Injection rate mm/s | Injection pressure bar | Cycle time s | Zone 1 ° C. | Zone 2 ° C. | Zone 3 ° C. | Zone 4 ° C. | Nozzle 5 ° C. | Mold temperature ° C. | Demolding | Pro-cessing |
|---|---|---|---|---|---|---|---|---|---|---|---|---|
| 1 (CE) | 10 | 15 | 60 | 74 | 195 | 215 | 220 | 220 | 220 | 50 | good | good |
| 2 (IE) | 10 | 15 | 60 | 74 | 195 | 215 | 220 | 220 | 220 | 50 | good | good |
| 3 (IE) | 10 | 15 | 80 | 74 | 195 | 215 | 220 | 220 | 220 | 50 | good | good |
| 4 (IE) | 10 | 15 | 80 | 74 | 195 | 215 | 220 | 220 | 220 | 50 | good | good |
| 5 (IE) | 10 | 15 | 92 | 74 | 195 | 215 | 220 | 220 | 220 | 50 | good | good |
| 7 (IE) | 10 | 15 | 130 | 74 | 195 | 215 | 220 | 220 | 220 | 50 | good | good |
| 8 (IE) | 10 | 15 | 86 | 74 | 195 | 215 | 220 | 220 | 220 | 50 | good | good |

Moduli of elasticity, impact resistances and notched impact resistances were determined on injection-molded test specimens.

TABLE 6

| | | | Example No. | | | | | | |
|---|---|---|---|---|---|---|---|---|---|
| | | | 1 (CE) | 2 (IE) | 3 (IE) | 4 (IE) | 5 (IE) | 7 (IE) | 8 (IE) |
| Density | [g/cm$^3$] | DIN EN ISO 1183-1, A | 1.06 | 1.14 | 1.17 | 1.14 | 1.15 | 1.13 | 1.13 |
| Shore | [D] | DIN ISO 761.9-1 | 76 | 76 | 79 | 76 | 79 | 78 | 78 |
| Tensile strength | [MPa] | DIN 53504 | 55 | 29 | 33 | 31 | 35 | 31 | 28 |
| Elongation at break | [%] | DIN 53504 | 290 | 300 | 340 | 360 | 340 | 330 | 370 |
| Modulus of elasticity from tensile test | [MPa] | DIN EN ISO 527 | 1250 | 1342 | 1492 | 1430 | 1586 | 1549 | 1613 |

The test specimens were subjected to heat treatment at 100° C. for 20 h. Thereafter, the test specimens remained under standard climatic conditions for 3 days before the mechanical properties were determined. All compositions of the invention have very good mechanical properties.

3.4 Cone Test

In order to assess flame retardancy, a test specimen with thickness 5 mm was tested horizontally at a radiation intensity of 35 kW/m$^2$ in a cone calorimeter in accordance with ISO 5660 Part 1 and Part 2 (2002-12).

TABLE 7

| | | | Example No. | | | | | | |
|---|---|---|---|---|---|---|---|---|---|
| | | | 1 (CE) | 2 (IE) | 3 (IE) | 4 (IE) | 5 (IE) | 7 (IE) | 8 (IE) |
| Total heat release (THR) | [MJ/m$^2$] | ISO 5660 part 1 | 202 | 172 | 170 | 183 | 181 | 179 | 177 |
| Peak of heat release rate (PHRR) | [kW/m$^2$] | ISO 5660 part 1 | 1023 | 705 | 272 | 773 | 825 | 568 | 537 |
| Time to ignition | [s] | ISO 5660 part. 1 | 188 | 143 | 84 | 138 | 93 | 134 | 110 |
| Initial mass | | ISO 5660 part 1 | 57 | 59 | 61 | 60 | 60 | 60 | 60 |
| Total mass loss | | ISO 5660 part 1 | 53 | 53 | 51 | 56 | 52 | 55 | 54 |

The inventive examples, compared to the comparative example, all have a low total heat release (THR) to some degree, and a distinct reduction in peak heat release rate (PHRR). These advantageous flame-retardant properties are particularly marked in inventive example 3.

4. Production Examples II 4.1 Example 9

Mixtures were produced from Ultramid RX 2298, Exolit OP 1230 and melamine cyanurate 15ED.

TABLE 8

| | | | Example No. | |
|---|---|---|---|---|
| | | | 9.1 | 9.2 |
| Ultramid RX 2298 | | | 80 | 70 |
| Melamine cyanurate MC 15ED | | | 10 | 20 |
| Exolit OP 1230 | | | 10 | 10 |
| Density | [g/cm$^3$] | DIN EN ISO 1183-1, A | 1.123 | 1.147 |
| Shore A | [A] | DIN 53505 | — | — |
| Shore D | [D] | DIN ISO 7619-1 | 77 | 79 |
| Tensile strength | [MPa] | DIN EN ISO 527 | 41 | 36 |
| Elongation at break | [%] | DIN EN ISO 527 | 30 | 90 |
| Tear propagation resistance | [kN/m] | DIN ISO 34-1, B (b) | 177 | 192 |
| Abrasion | [mm$^3$] | DIN 53516 | 83 | 134 |
| Modulus of elasticity | [MPa] | DIN EN ISO 527 | 1374 | 2032 |
| Charpy notched impact resistance 23° C. | [kJ/m$^2$] | DIN EN ISO 179-1/1eA | 4.03 | not determined |
| Charpy notched impact resistance −30° C. | [kJ/m$^2$] | DIN EN ISO 179-1/1eA | 3.29 | not determined |
| Visual assessment | | | opaque | opaque |
| UL 94 V (1.6 mm) | | | V2 | V0 |

4.2 Example 10

Various illustrative mixtures were produced from Ultramid RX 2298, AC 85A12, 1160D10, Exolit OP 1230, Fyrolflex RDP, melamine polyphosphate MC 200/70 and melamine cyanurate MC 15ED.

TABLE 9

| | | | Example No. | | | |
|---|---|---|---|---|---|---|
| | | | 10.1 | 10.2 | 10.3 | 10.4 |
| Ultramid RX 2298 | | | 20 | 20 | 70 | 20 |
| AC 85A12 | | | 50 | | 10 | 60 |
| 1160D10 | | | | 50 | | |
| Melamine cyanurate MC 15ED | | | | | 10 | |
| Exolit OP 1230 | | | 20 | 20 | 10 | 10 |
| Melamine polyphosphate MC 200/70 | | | 10 | 10 | | |
| Fyrolflex RDP | | | | | | 10 |
| Density | [g/cm$^3$] | DIN EN ISO 1183-1, A | 1.142 | 1.125 | 1.124 | 1.107 |
| Shore A | [A] | DIN 53505 | — | 97 | — | 99 |
| Shore D | [D] | DIN ISO 7619-1 | 69 | 62 | 75 | 62 |
| Tensile strength | [MPa] | DIN EN ISO 527 | 26 | 7 | 35 | 25 |
| Elongation at break | [%] | DIN EN ISO 527 | 300 | 70 | 50 | 330 |
| Tear propagation resistance | [kN/m] | DIN ISO 34-1, B (b) | 143 | 90 | 152 | 133 |
| Abrasion | [mm$^3$] | DIN 53516 | 129 | 125 | 109 | 110 |
| Modulus of elasticity | [MPa] | DIN EN ISO 527 | not determined | not determined | 1955 | not determined |
| Visual assessment | | | opaque | opaque | opaque | opaque |
| UL 94 V (1.6 mm) | | | V0 | V2 | V0 | V2 |

4.3 Example 11

Various illustrative mixtures were produced from Ultramid RX 229, AC 85A12, 1160D10, Exolit OP 1230, Fyrolflex RDP, melamine polyphosphate MC 200/70 and melamine cyanurate MC 15ED.

TABLE 10

| | Example No. | | | | | |
|---|---|---|---|---|---|---|
| | 11.1 | 11.2 | 11.3 | 11.4 | 11.5 | 11.6 |
| Ultramid RX 2298 | 55 | 60 | 54 | 60 | 55 | 55 |
| AC 85A12 | 5 | 5 | 5 | 5 | 5 | 5 |
| Melamine cyanurate MC 15 ED | 10 | 10 | 10 | | | 20 |

TABLE 10-continued

| | | | Example No. | | | | | |
|---|---|---|---|---|---|---|---|---|
| | | | 11.1 | 11.2 | 11.3 | 11.4 | 11.5 | 11.6 |
| Exolit OP 1230 | | | 10 | 20 | 20 | 20 | 20 | 10 |
| Melaminepolyphosphate MC 200/70 | | | | | | 10 | 10 | |
| Fyrolflex RDP | | | | | | | | |
| Chopvantage HP3550 EC10-3,8 | | | 20 | 5 | 10 | 5 | 10 | 10 |
| Density | [g/cm$^3$] | DIN EN ISO 1183-1, A | 1.282 | 1.174 | 1.197 | 1.186 | 1.236 | 1.197 |
| Tensile strength | [MPa] | DIN EN ISO 527 | 57 | 37 | 56 | 41 | 57 | 62 |
| Elongation at break | [%] | DIN EN ISO 527 | 5 | 12 | 8 | 12 | 8 | 8 |
| Modulus of elasticity | [MPa] | DIN EN ISO 527 | 16726 | 2640 | 3695 | 2736 | 3818 | 4075 |
| Visual assessment | | | opaque | opaque | opaque | opaque | opaque | opaque |
| UL 94 V (2.0 mm) | | | V0 | V0 | V0 | V0 | V0 | V0 |

5. Methods of Measurement

Density, Shore hardness, tensile strength, tear propagation resistance, abrasion and elongation at break were determined on films having a thickness of 1.6 mm. The films were extruded with an Arenz single-screw extruder having a three-zone screw with a mixing section (screw ratio 1:3). The films were assessed in accordance with their appearance.

UL 94V and HB flame tests were conducted either on 1.6 mm films or on 2 mm injection-molded plaques.

Moduli of elasticity, impact resistances and notched impact resistances were determined on injection-molded test specimens. For this purpose, test specimens were produced on an Arburg 520S having a screw diameter of 30 mm.

Burst pressures were determined on hoses having an external diameter of 8.0 mm and an internal diameter of 5.5 mm. The hoses were extruded with a Kuhne single-screw extruder having a three-zone screw with a mixing section (screw ratio 1:3).

CITED LITERATURE

EP 0 352 562 A1
DE 28 46 596 A1
WO 2018/050487 A1
EP 2878630 B1
WO 2017/063841 A1

The invention claimed is:

1. A composition, comprising:

(I) 20% to 80% by weight of a copolyamide (PA-1) and (II) 20% to 40% by weight of a flame retardant, based on overall composition weight;

wherein the copolyamide (PA-1) is prepared by polymerization of: (A) 15% to 84% by weight of at least one lactam, and (B) 16% to 85% by weight of a monomer mixture (M), based on a sum total of percentages by weight of the components (A) and (B);

wherein the monomer mixture (M) comprises: (B1) 45 to 55 mol % of at least one C32-C40 dimer acid, and (B2) 45 to 55 mol % of at least one C4-C12 diamine;

wherein the flame retardant is selected from the group consisting of a melamine cyanurate, magnesium hydroxide, a phosphorus-containing flame retardant, and a mixture of the melamine cyanurate and the phosphorus-containing flame retardant;

wherein the phosphorus-containing flame retardant is selected from the group consisting of a derivative of phosphoric acid, a derivative of phosphonic acid, a derivative of phosphinic acid, and mixtures of two or more of these derivatives; and wherein the composition has a broad processing range of from 180° C. to 240° C.

2. The composition according to claim 1, wherein the phosphorus-containing flame retardant is a mixture of a first flame retardant (F1) selected from the group consisting of a derivative of phosphoric acid, a derivative of phosphonic acid, and mixtures thereof, and a second flame retardant (F2) selected from the group consisting of a derivative of phosphinic acid.

3. The composition according to claim 2, wherein the first flame retardant (F1) is selected from the group consisting of resorcinol bis(diphenyl phosphate) (RDP), bisphenol A bis(diphenyl phosphate) (BDP), diphenyl cresyl phosphate (DPK), and mixtures thereof.

4. The composition according to claim 1, wherein the copolyamide (PA-1) has a glass transition temperature (TGc) in the range of from 20 to 50° C.

5. The composition according to claim 1, comprising 20% by wt. of the flame retardant (II).

6. The composition according to claim 1, comprising 30% by wt. of the flame retardant (II).

7. The composition according to claim 1, wherein component (B1) is at least one C36 dimer acid.

8. The composition according to claim 1, wherein component (B2) is selected from the group consisting of tetramethylenediamine, pentamethylenediamine, hexamethylenediamine, decamethylenediamine and dodecamethylenediamine.

9. The composition according to claim 1, wherein the copolyamide (PA-1) is a random copolymer.

10. The composition according to claim 1, wherein the copolyamide (PA-1) has a glass transition temperature (TGc) in the range of from 25 to 45° C.

11. The composition according to claim 1, further comprising: at least one filler selected from the group consisting of glass fibers, carbon fibers, aramid fibers, potassium titanate fibers, fibers of liquid-crystalline polymers, metal fibers, polyester fibers, polyamide fibers, organic fibrous fillers and inorganic fibrous fillers.

12. A process for producing the composition of claim 1, the process comprising:

(a) providing components (I) and (II) such that component (I) is present in amount of 20% to 80% by weight and component (II) is present in an amount of 20% to 40% by weight, based on overall composition weight; and (b) mixing components (I) and (II) within the processing range of from 180° C. to 240° C.

13. The process according to claim 12, further comprising:

optionally drying the components prior to step (b), at a temperature of from 80° C. to 100° C., and a period of from 2 to 4 hours.

14. The process according to claim 12, wherein the mixing in (b) is performed at a temperature of from 200° C. to 225° C.

15. A method, comprising: producing a shaped article with the composition according to claim 1.

16. A shaped article, prepared by the method of claim 15.

17. The shaped article according to claim 16, wherein the article is transparent.

* * * * *